(12) United States Patent
Schaeffer et al.

(10) Patent No.: US 6,670,049 B1
(45) Date of Patent: Dec. 30, 2003

(54) METAL/CERAMIC COMPOSITE PROTECTIVE COATING AND ITS APPLICATION

(75) Inventors: Jon C. Schaeffer, Milford, OH (US); Russell L. McCarron, Cincinnati, OH (US); Dennis M. Gray, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/435,902

(22) Filed: May 5, 1995

(51) Int. Cl.$^7$ .................. B22F 5/00; B23B 15/02; B21D 39/00

(52) U.S. Cl. ............... 428/552; 428/556; 428/558; 428/559; 428/564; 428/565; 428/568; 428/621

(58) Field of Search .................. 428/539.5, 548, 428/551, 552, 553, 554, 555, 556, 558, 559, 564, 565, 568, 615, 621, 632

(56) References Cited

U.S. PATENT DOCUMENTS

| | | | | |
|---|---|---|---|---|
| 3,785,785 A | * | 1/1974 | Hodshire et al. | 29/195 Y |
| 3,864,093 A | * | 2/1975 | Wolfla | 29/195 |
| 4,250,610 A | * | 2/1981 | Wilbers et al. | 29/424 |
| 4,292,077 A | * | 9/1981 | Blackburn et al. | 75/175.5 |
| 4,681,818 A | | 7/1987 | Unnam et al. | 428/607 |
| 4,704,336 A | * | 11/1987 | Spriggs | 428/552 |
| 4,761,346 A | | 8/1988 | Naik | 428/627 |
| 4,816,347 A | * | 3/1989 | Rosenthal et al. | 428/615 |
| 4,596,718 A | | 10/1989 | Gruner | 427/34 |
| 4,900,640 A | * | 2/1990 | Bell et al. | 428/633 |
| 4,980,244 A | | 12/1990 | Jackson | 428/670 |
| 5,077,140 A | | 12/1991 | Luthra et al. | 428/660 |
| 5,116,690 A | | 5/1992 | Brindley et al. | 428/614 |
| 5,223,332 A | * | 6/1993 | Quets | 428/216 |
| 5,236,787 A | | 8/1993 | Grassi | 428/552 |
| 5,281,487 A | | 1/1994 | Rumaner et al. | 428/552 |
| 5,328,763 A | * | 7/1994 | Terry | 428/559 |
| 5,330,826 A | * | 7/1994 | Taylor et al. | 428/216 |
| 5,336,292 A | * | 8/1994 | Weinl et al. | 75/230 |

* cited by examiner

Primary Examiner—Patrick Ryan
Assistant Examiner—Thomas H. Parsons
(74) Attorney, Agent, or Firm—Gregory Garmong; Carmen Santa Maria; McNees Wallace & Nurick LLC

(57) ABSTRACT

An environmental coating is applied to the surface of a titanium-base alloy substrate to protect the surface from oxidation, corrosion, erosion, and other damage. The coating is a mixture of a metal and a ceramic, each selected to contribute to the protective function. The proportions of the metal and the ceramic in the coating are selected such that the coefficient of thermal expansion of the coating is about the same as the coefficient of thermal expansion of the substrate.

10 Claims, 3 Drawing Sheets

METAL/CERAMIC COMPOSITE PROTECTIVE COATING AND ITS APPLICATION

The Government has rights in this invention pursuant to Contract No. F33615-90-C-5960 awarded by the Department of the Air Force.

BACKGROUND OF THE INVENTION

This invention relates to protective coatings on substrates, and, more particularly, to a composite protective coating formed of a mixture of a metal and a ceramic.

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust combustion gas temperature, which in turn leads to higher operating temperature requirements of many of the components from which the engine is constructed. In response to these requirements, alloys with improved mechanical properties have been developed for use in the various sections of the engines.

It has been the conventional practice to use nickel-base and cobalt-base alloys for components that operate at high temperatures, and additionally for components operating at intermediate temperatures. These alloys are relatively dense, and there has been an ongoing effort to substitute less-dense materials in intermediate-temperature components. Among these substitute materials are titanium-base alloys being developed for use in high-pressure compressor blades and vanes, as well as other portions of the engine structure. Such components typically operate at temperatures of from about 1000° F. to about 1800° F. They are not cooled by internal cooling or other mechanisms.

Even at these intermediate operating temperatures there can be extensive damage to the engine components due to oxidation, hot corrosion, hot salt stress corrosion, and other mechanisms. To inhibit such damage, environmental coatings for the uncooled components have been developed. Unlike thermal barrier coatings used on cooled components such as high-pressure turbine blades and vanes, these environmental coatings do not provide an insulating function, but instead are designed solely to reduce the incidence of damage to the uncooled component.

The available environmental coatings for uncooled titanium-base gas turbine engine components are metallic alloys that form a protective oxide scale over the substrate to which they are applied. These environmental coatings, while operable, can separate from the substrate during the thermal cycling experienced in extended service. Some may also chemically react with the highly reactive titanium-base substrate during service to form undesirable phases which themselves degrade the performance of the component.

There is a need for an improved approach to protecting uncooled substrates made of titanium-base alloys, which achieves good environmental protection of the substrates without the disadvantages found in current environmental protective coatings.

SUMMARY OF THE INVENTION

The present invention provides a coating and a titanium-base alloy article that is coated with the coating to protect it during elevated temperature service in adverse environments. The coating provides excellent protection against diffusionally based oxidation as well as hot corrosion, hot salt stress corrosion, hot erosion, and other damage mechanisms. Reaction of the coating with the titanium-base substrate is minimal. The coating bonds well to the substrate. The coating is designed to avoid the creation of excessive thermal strains and stresses that would otherwise be present due to the difference in thermal expansion coefficients of the coating and the metallic substrate. Consequently, no weight-adding bond coat is required between the protective coating and the substrate. The protective coating can be applied to the substrate using well established procedures such as thermal spraying techniques.

In accordance with the invention, an article comprises a substrate formed of a first metal comprising a titanium-base alloy, and a coating directly in contact with the substrate. The coating is formed of a mixture of a second metal and a ceramic. The second metal is preferably an environmentally resistant metal such as a nickel-base alloy or a cobalt-base alloy. The ceramic is preferably an aluminum-bearing, chromium-bearing, or silicon-bearing ceramic, most preferably an oxide. The second metal and the ceramic are selected to impart desired properties to the coating. For example, the second metal is an alloy that is selected for its excellent corrosion or oxidation resistance, and the ceramic can be selected for its high impermeability to oxygen diffusion, low thermal conductivity, and/or low thermal expansion. These properties are reflected in the mixture.

The substrate has a substrate coefficient of thermal expansion, and the coating mixture has a mixture coefficient of thermal expansion. In the preferred approach, the mixture coefficient of thermal expansion is about the same as that of the substrate coefficient of thermal expansion over at least some temperature range. To this end, in the preferred approach the thermal expansion coefficient of the substrate is determined, and a coating proportion of the second metal and the ceramic is selected such that the thermal expansion coefficient of the mixture that forms the coating is about the same as the thermal expansion coefficient of the substrate.

In the composite coating mixture the beneficial properties of the individual constituents are retained. The coating can therefore be designed to have good protective characteristics by virtue of the selection of the constituents. The coefficient of thermal expansion of the coating is related to the relative amounts of the metallic constituent, which has a high coefficient of thermal expansion, and the ceramic constituent, which has a low coefficient of thermal expansion. Consequently, the relative amounts of the constituents are selected so that the thermal expansion coefficient of the coating approximately matches that of the substrate, minimizing the likelihood of debonding of the coating from the substrate during thermal processing or service. The composite mixture structure of the coating also reduces its susceptibility to cracking and fatigue cracking, inasmuch as the metal matrix of the coating serves to inhibit crack propagation through the ceramic material of the coating. Lastly, the presence of the ceramic in the coating reduces the amount of contact area between the metallic component of the coating and the surface of the substrate, reducing the extent of available surface area over which adverse reactions, if any, between the metallic component of the coating and the surface of the substrate can occur.

The present invention provides an important advance in the art of environmental protection of substrates. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
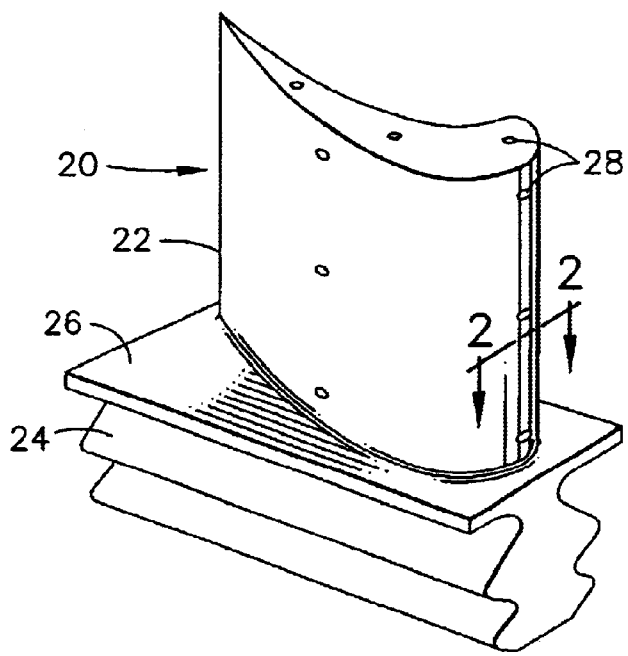
FIG. 1 is a perspective view of a component of a gas turbine engine.

FIG. 1 depicts an article component of a gas turbine engine, in this case a low-pressure turbine blade 20. (The invention is also useful in relation to other components such as hangers, cases, compressor vanes, combustion cases, and exhaust flaps, for example.) The blade 20 includes an airfoil 22 against which the flow of hot exhaust gas is directed. The blade 20 is mounted to a disk (not shown) by a dovetail 24 which extends downwardly from the airfoil 22 and engages a slot on the disk. A platform 26 extends longitudinally outwardly from the area where the airfoil 22 is joined to the dovetail 24. The component is not internally cooled.

Figure 2:
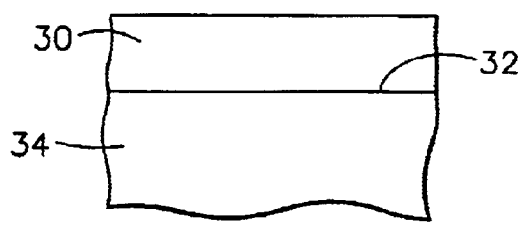
FIG. 2 is a schematic enlarged sectional view through the component of FIG. 1, taken along line 2—2 of FIG. 1.

FIG. 2 illustrates a coating 30 deposited on a surface 32 of the blade 20, which thereby acts as a substrate 34. In the illustrated case, the coating 30 is directly in contact with the substrate 34. The term "directly in contact with" means that no bond coat is present between the substrate and the coating, the preferred embodiment of the invention.

The substrate 32 may be formed of any operable material. A preferred base metal, which may be termed a "first metal", from which the article substrate is formed is a titanium-base alloy. The preferred base materials of most interest to the inventors are a titanium aluminide intermetallic alloy of titanium and aluminum, such as a gamma or alpha-2 titanium aluminide, a titanium-niobium alloy, a titanium-aluminum-niobium alloy, or a titanium-matrix metal-matrix composite material. Including niobium in the substrate alloy is often desirable because it significantly lowers the coefficient of thermal expansion of the alloy and thence the substrate. Such substrate materials are of interest in forming high pressure compressor blades and vanes, blisks, exhaust structures, shroud supports, bearing supports, low pressure turbine blades, turbine and combustor cases, and other components in gas turbine engines.

The coating 30 is in the form of a layer on, and directly in contact with, the surface 32 of the substrate 34. The coating is preferably at least about 0.003 inches thick, and most preferably from about 0.005 inches to about 0.010 inches thick. If the coating is less than about 0.003 inches thick, there can be unacceptable paths or openings in the coating through which the underlying substrate is exposed to the hot exhaust gas environment. The coating 30 may be made relatively thick, because the coefficient of thermal expansion of the preferred coating is about the same as that of the substrate. It is always preferred that the coating not be thicker than required for protection of the substrate, inasmuch as thicker coatings add weight, are more susceptible to separation from the substrate, and are more expensive.

Figure 3A:
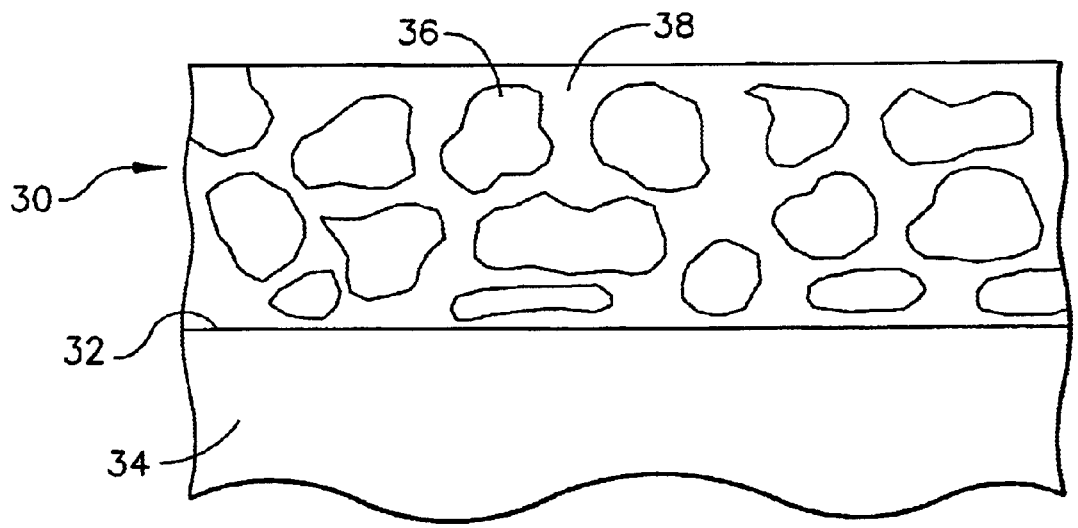
FIG. 3A is a further enlargement of a portion of FIG. 2, showing an idealized microstructure of a first embodiment of the coating.
Figure 3B:
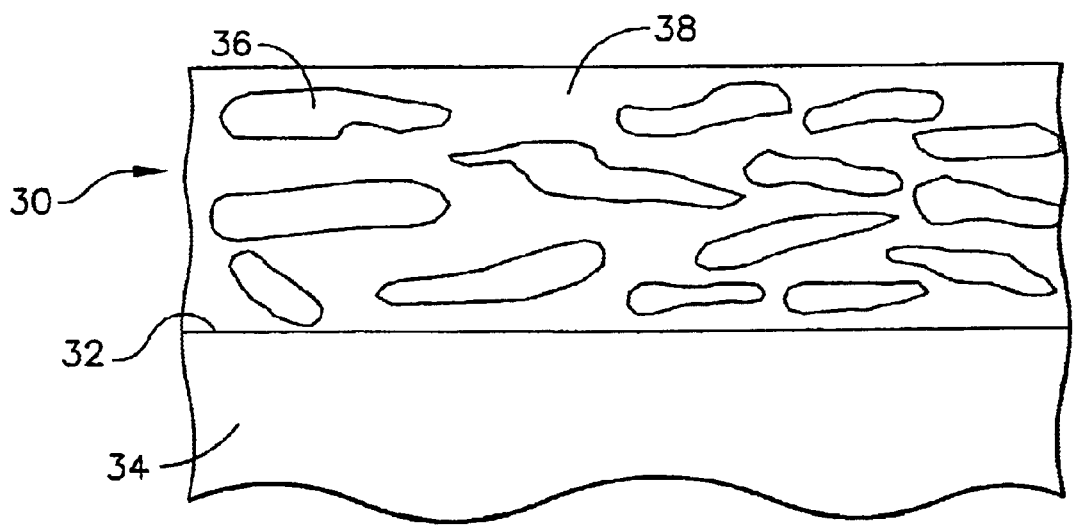
FIG. 3B is a view like that of FIG. 3A, showing an idealized microstructure of a second embodiment of the coating.

The microstructure of the coating 30 is illustrated in two idealized forms in FIGS. 3A and 3B. The coating 30 is a mixture of ceramic particles 36 distributed in a matrix 38 made of a metal, which may be termed a "second metal". The particles 36 may be of any operable shape. In the embodiment of FIG. 3A, the particles 36 are generally equiaxed. In the embodiment of FIG. 3B, the particles 36 are flattened and platelike, which can result from some deposition techniques. In this latter case, the particles are somewhat layered in the direction perpendicular to their direction of application and parallel to the surface 32 of the substrate 34.

The relative proportions of the ceramic particles and the metal matrix an be varied in the manner to be discussed subsequently, causing the relative mounts of the two constituent phases to vary. It is preferred that the ceramic particles 36 occupy no less than about 30 percent by volume of the coating 30. If the ceramic particles occupy less than this proportion of the coating, the coating will be ineffective due to insufficient erosion protection of the substrate by the ceramic. It is preferred that the ceramic particles occupy not more than about 70 percent by volume of the coating. If the ceramic particles occupy more than this proportion of the coating, it is difficult to achieve good bonding of the particles into the matrix and thence into the coating, and the fracture resistance of the coating in tension and fatigue is reduced.

In a mixture like that of the coating 30, each constituent retains the physical characteristics exhibited when it is apart from the mixture. These characteristics are imparted to the mixture in varying degrees. A mixture is to be contrasted with an alloy, where the separate physical characteristics of the constituents are often no longer recognizable.

The ceramic of the particles 36 desirably has a low permeability to diffusion of oxygen therethrough. Ceramics containing aluminum, chromium, or silicon as a major constituent typically exhibit this desired low permeability to oxygen diffusion. The ceramic is also preferably hard and resistant to erosion, so that the coating is also resistant to erosion. The ceramic is preferably an oxide such as alumina, chromia, or silica, but other forms such as zirconia and yttria-stabilized zirconia (YSZ) are also operable. Other ceramic forms such as carbides (e.g., silicon carbide), nitrides (e.g., silicon nitride), or silicides (e.g., molybdenum disilicide) can also be used.

The ceramic is furnished in the form of particles, which may be generally equiaxed particles as shown in FIG. 3A, plate-like particles as shown in FIG. 3B, or other regular or irregular shape. Particles that are initially generally equiaxed may become flattened and plate-like in shape as shown in FIG. 3B when applied by techniques such as thermal spray processes, for example. The particle size is not critical, as long as it is substantially less than the thickness of the coating and can be applied by the selected procedure. In a typical case, for a coating 30 applied by thermal spraying, the particles are −150/+325 mesh.

The metal matrix 38 is desirably a nickel-base alloy or a cobalt-base alloy. The metal of the matrix 38 is selected to impart desired properties to the coating. These desired properties are selected according to the protective needs of the substrate and the service environment Various metals that are particularly resistant to oxidation, corrosion in specific environments, or hot stress corrosion cracking are known in the art. For example, NiCrAlY, FeCrAlY, CoCrAlY, and NiCoCrAlY formulations of nickel alloys are known to have good oxidation resistance.

Figure 4:
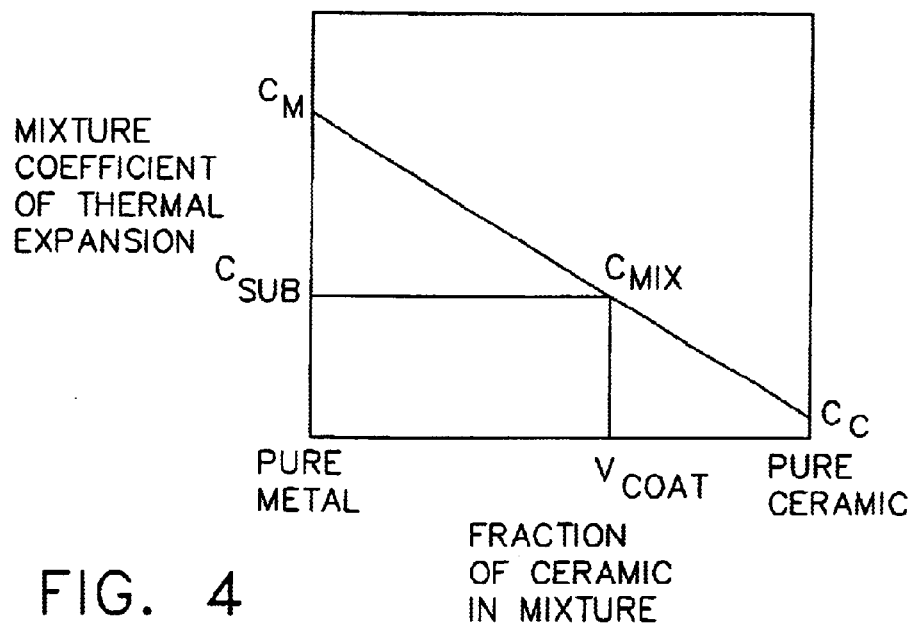
FIG. 4 is an idealized graph showing the relation between coefficient of thermal expansion of a metal/ceramic mixture.

The substrate 34 is characterized by a substrate coefficient of thermal expansion $C_{SUB}$. The coefficient of thermal expansion of the coating mixture, $C_{MIX}$, is determined by the proportions of the ceramic particles 36 and the metal matrix 38 present in the coating, the thermal expansion coefficient of the ceramic, $C_C$, and the thermal expansion coefficient of the metal matrix, $C_M$. FIG. 4 illustrates schematically the relation between these parameters. In this idealized graph, there is a linear dependence of $C_{MIX}$ of the form $$C_{MIX} = V_C C_C + (1 - V_C) C_M$$

wherein $V_C$ is the volume fraction of ceramic particles 36 in the mixture and $(1-V_C)$ is the volume fraction of metal matrix 38 in the mixture. This linear relationship is often not strictly applicable in real systems, but is a reasonable approximation for the purposes of the present invention. A nonlinear form of the relationship does not adversely affect operability of the invention.

$C_C$ is usually substantially lower than $C_M$, as shown. The ceramic and metal are selected so that $C_C$ is smaller than $C_{SUB}$ and $C_M$ is larger than $C_{SUB}$. The relative proportions of ceramic and metal in the mixture selected for use in the coating 30 can be characterized as a volume fraction of ceramic in the coating, $V_{COAT}$. The preferred value of $V_{COAT}$ is found using the graph of FIG. 4 (or equivalently, the mathematical relationship above), by setting $C_{MIX}$ equal to $C_{SUB}$, and solving for the corresponding volume fraction $V_C$, equal to $V_{COAT}$.

The coating 30 having $V_{COAT}$ approximately equal to $V_{SUB}$ will experience little or no thermal expansion strains and stresses as the coated substrate is heated or cooled in a range where this relation is valid. Consequently, there is a greatly decreased tendency for the coating to separate to from the substrate by spalling or flaking, the usual failure modes. No bond coat is required or present to ensure adherence of the coating 30 to the substrate 34.

The proportion of the constituents can also be selected so as to obtain other desired relations between the coating and the substrate. For example, it might be desirable that the coating be in compression at a temperature less than its application temperature. In that instance, $V_{COAT}$ would be selected such that $C_{COAT}$ is smaller than $C_{SUB}$ by some amount.

Figure 5:
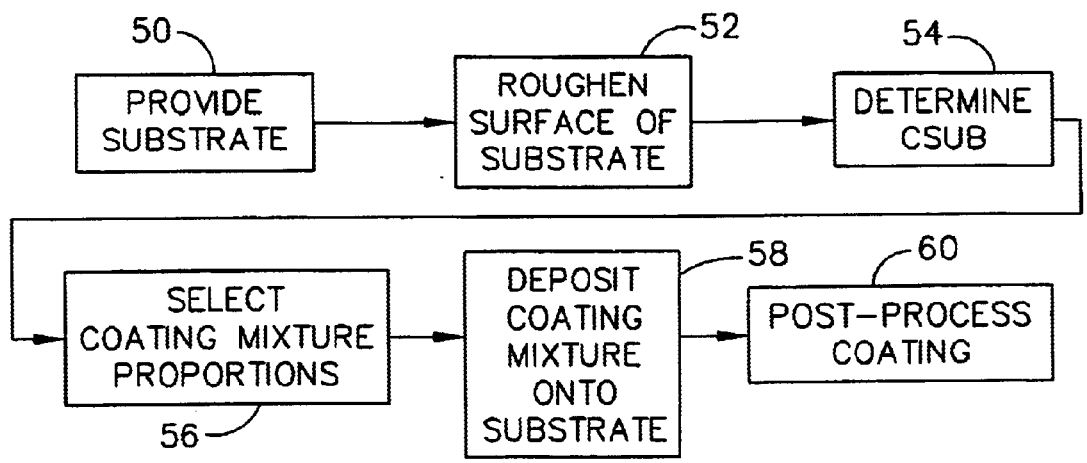
FIG. 5 is a block diagram of the method of the invention.

FIG. 5 depicts a preferred method for practicing the invention. A substrate 30 of the type previously discussed is provided, numeral 50. The surface 32 of the substrate 30 is optionally roughened, numeral 52. Roughening is preferably accomplished by grit blasting, which also serves to clean the surface. The roughening of the surface improves adherence of the coating to the surface through a keying action. The roughened surface preferably is characterized by a roughness of 50–150 microinches RMS (root mean square).

The coefficient of thermal expansion of the substrate, $C_{SUB}$ is determined, numeral 54. Conventional measurement techniques are used.

The proportions of ceramic and metal matrix to be used in the composite mixture are selected, numeral 56. In this step, the ceramic and metal themselves are first selected according to the considerations discussed previously. The proportion of each constituent is next determined. The thermal expansion coefficients $C_C$ and $C_M$ are usually available in reference works. $C_{MIX}$ can be estimated to a first approximation by assuming a linear relationship between the end values of $C_C$ and $C_M$, as in FIG. 4. This approximation is usually sufficient for the purposes of the present invention. If a more precise relation is required, specimens of the mixture having a range of known values of the proportions of the constituents can be prepared. These specimens are measured and the results plotted in the manner shown in FIG. 4, except that the relation may not be linear. Once the graphical or mathematical relation is established, the value of $V_{COAT}$ can be found using the approach discussed previously.

Figure 6:
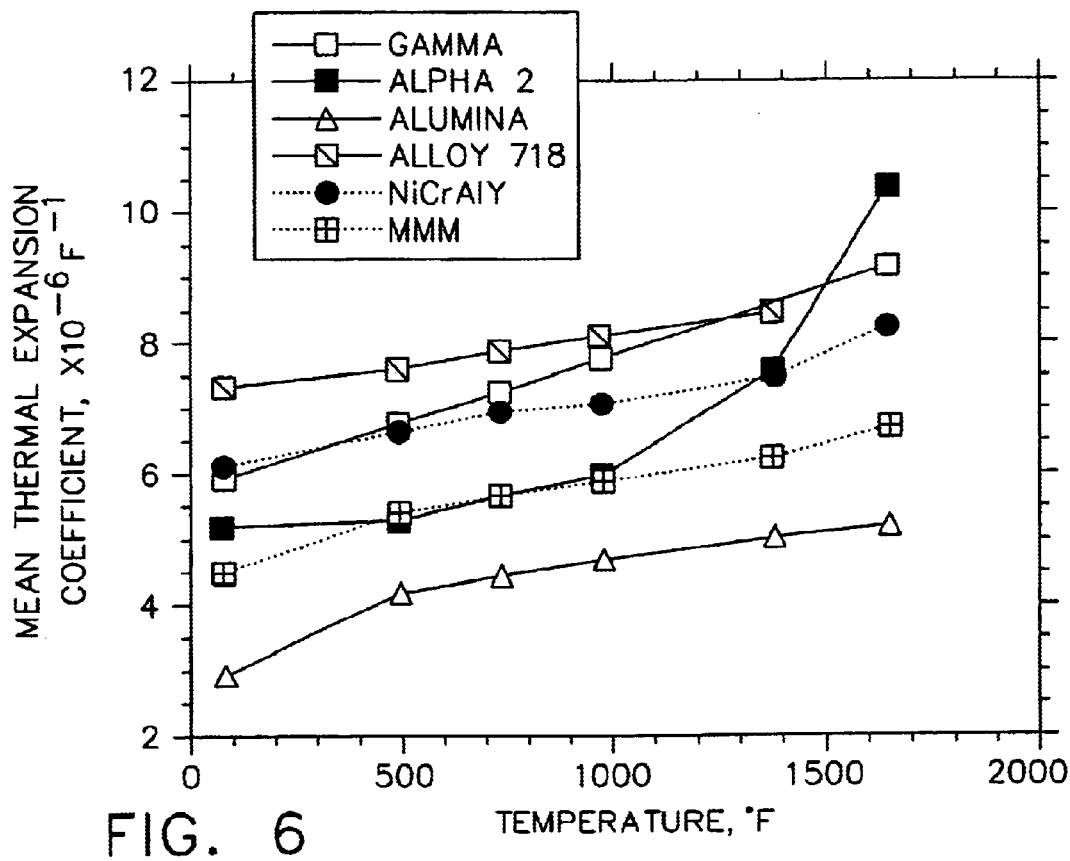
FIG. 6 is a graph of coefficient of thermal expansion of several materials as a function of temperature.

In the preferred mixture, $C_{SUB}$ is "about" the same as $C_{COAT}$. The use of "about" here is intended to indicate an approximate equivalence of the thermal expansion properties, while recognizing an inability to achieve an exact equivalence of the coefficients of thermal expansion when the invention is applied in the context of real engineering materials. FIG. 6 illustrates that the coefficient of thermal expansion of most engineering materials varies with the temperature of measurement. FIG. 6 shows the coefficients of thermal expansion $C_{SUB}$ of some gamma and alpha-2 titanium aluminide substrate materials. Also shown are the thermal expansion coefficients for alumina ceramic ($C_C$), a Ni-24Cr-12Al-0.4Y (in weight percents) metal matrix NiCrAlY alloy ($C_M$), and a composite mixture of 50 volume percent alumina and 50 volume percent NiCrAlY ($C_{MIX}$, labelled MMM). All of the coefficients of thermal expansion vary as a function of temperature, making the exact matching of such coefficients for all temperatures a virtual impossibility.

In FIG. 6, the 50 volume percent ceramic-50 volume percent metal matrix proportion of constituents was chosen so that $C_{MIX}$ is about the same as that of $C_{SUB}$ for alpha-2 titanium aluminide over a temperature range of about ambient temperature to about 1000° F., an important temperature range for certain applications. This objective was achieved in an approximate sense. There is excellent matching of the coefficients in the range of about 500° F. to about 1000° F., but a minor difference, judged to be acceptable, at lower temperatures. By way of comparison, FIG. 6 also shows the coefficient of thermal expansion for a non-mixture, conventional metallic coating material used for titanium-base alloys, Alloy 718. The composition of Alloy 718, a trade name of Inco Alloys International, Inc., in weight percent, is 50–55 percent nickel, 17–21 percent chromium, 4.75–5.5 percent niobium, 2.8–3.3 percent molybdenum, 0.65–1.15 percent titanium, 0.2–0.8 percent aluminum, 1 percent maximum cobalt, 0.35 percent maximum manganese, 0.35 percent maximum silicon, 0.015 percent maximum phosphorus, 0.015 percent maximum sulfur, 0.006 percent maximum boron, 0.3 percent maximum copper, 0.08 percent maximum carbon, balance iron.) This alloy exhibited a thermal expansion coefficient significantly greater than that of the alpha-2 titanium aluminide over the entire temperature range, making it a less suitable coating material than the metal-matrix composite material.

Once the coating material is selected, it is deposited onto the substrate, numeral 58. Deposition can be by any operable technique. The preferred deposition and application technique is metal/ceramic spraying. In a most preferred approach, the metal and ceramic powders in the selected proportions are fed to a single plasma spray torch or gun and thence deposited upon the substrate by thermal spraying. Alternatively, the powders can be fed to two separate guns or torches and deposited. In either case, structures like those of FIGS. 2 and 3 result.

The coating may optionally be post-processed, numeral 60, after the deposition step 58, to modify the character of the exposed surface of the coating 30. Post-processing can include, for example, peening or polishing the exposed surface of the coating 30 to improve properties such as fatigue resistance. Such post-processing may be performed for the coating 30, which is partly metallic and therefore has a degree of ductility, whereas such post processing cannot ordinarily be practiced with conventional all-ceramic thermal barrier coatings.

The present invention has been practiced for the circumstances associated with FIG. 6. A coating of 50 volume percent alumina and 50 volume percent Ni-24Cr-12Al-0.4Y ("NiCrAlY") was applied to an alpha-2 titanium aluminide substrate. The coated substrate was subjected to environmental testing consisting of cycling between 1650° F. and 1400° F., with five minutes at each temperature, in an atmosphere of 1–2 parts per million of sea salt for 600 cycles. No failure was observed. For comparison, a coating of Alloy 718 was applied to an alpha-2 titanium aluminide specimen. The comparison specimen exhibited extensive thermal fatigue cracking in this testing.

This invention has been described in connection with specific embodiments and examples. However, those skilled in the art will recognize various modifications and variations of which the present invention is capable without departing from its scope as represented by the appended claims.

What is claimed is:

1. An article comprising:
   a substrate which is an uncooled component of a gas turbine engine, the substrate being formed of a first metal comprising a titanium-base alloy; and
   a coating directly in contact with the substrate, the coating being formed of a mixture of a ceramic and a second metal, the second metal being selected from the group consisting of a nickel-base alloy and a cobalt-base alloy, wherein the substrate has a substrate coefficient of thermal expansion, and the mixture has a mixture coefficient of thermal expansion, and wherein the relative amounts of the ceramic and the second metal in the mixture are such that the coefficient of thermal expansion of the mixture is about the same as the substrate coefficient of thermal expansion over at least some temperature range.

2. The article of claim 1, wherein the first metal is an alloy comprising titanium and aluminum.

3. The article of claim 1, wherein the first metal is an alloy comprising titanium, niobium, and aluminum.

4. A method for preparing an article, comprising the steps of:
   providing a substrate made of a first metal comprising a titanium-base alloy; and
   applying a coating directly in contact with a surface of the substrate, the coating being formed of a mixture of a second metal and a ceramic, wherein the step of applying includes the steps of
      determining the thermal expansion coefficient of the substrate, and
      selecting a coating proportion of the second metal and the ceramic such that the thermal expansion coefficient of the coating has a selected relation to the thermal expansion coefficient of the substrate.

5. The method of claim 4, wherein the step of applying includes the step of
   selecting a coating proportion of the second metal and the ceramic such that the thermal expansion coefficient of the coating is about the same as the thermal expansion coefficient of the substrate.

6. The method of claim 4, wherein the step of applying includes the step of
   thermal spraying the second metal and the ceramic onto the surface of the substrate.

7. The method of claim 4, wherein the step of applying includes the step of
   roughening the surface of the substrate, and thereafter applying the coating over the roughened surface.

8. The method of claim 4, wherein the step of providing includes the step of
   providing the substrate made of an alloy comprising titanium and aluminum.

9. The method of claim 4, wherein the step of applying includes the step of
   providing the second metal selected from the group consisting of a nickel alloy and a cobalt alloy.

10. The method of claim 4, wherein the step of applying includes the step of
    providing a ceramic selected from the group consisting of an oxide, a carbide, a nitride, and a silicide.

* * * * *